United States Patent
Lee et al.

(10) Patent No.: US 11,685,337 B2
(45) Date of Patent: Jun. 27, 2023

(54) AIRBAG APPARATUS FOR PROTECTING PEDESTRIAN

(71) Applicant: HYUNDAI MOBIS CO., LTD., Seoul (KR)

(72) Inventors: Seok Min Lee, Yongin-si (KR); Seok Hoon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 4 days.

(21) Appl. No.: 17/652,861

(22) Filed: Feb. 28, 2022

(65) Prior Publication Data

US 2022/0306039 A1    Sep. 29, 2022

(30) Foreign Application Priority Data

Mar. 24, 2021 (KR) .......................... 10-2021-0038101

(51) Int. Cl.
*B60R 21/36* (2011.01)
*B60R 21/34* (2011.01)

(52) U.S. Cl.
CPC ........ *B60R 21/36* (2013.01); *B60R 2021/346* (2013.01)

(58) Field of Classification Search
CPC ................................. B60R 21/34; B60R 21/36
See application file for complete search history.

(56) References Cited

U.S. PATENT DOCUMENTS

| | | | | |
|---|---|---|---|---|
| 7,828,106 B1* | 11/2010 | Ratajski | ................. | B60R 21/13 296/210 |
| 9,463,769 B2* | 10/2016 | Park | ....................... | B60R 21/36 |
| 9,511,740 B2* | 12/2016 | Park | .................... | B60R 21/2338 |
| 2003/0178239 A1* | 9/2003 | Takimoto | ............... | B60R 21/36 180/274 |
| 2006/0097491 A1* | 5/2006 | Saberan | ............... | B60R 21/232 280/730.2 |
| 2006/0201731 A1* | 9/2006 | Nakamura | ............. | B60R 21/36 180/274 |
| 2007/0112513 A1* | 5/2007 | Mathevon | ........... | B60R 21/0136 701/96 |
| 2010/0148476 A1* | 6/2010 | Inoue | ..................... | B60R 21/36 280/728.2 |
| 2010/0252350 A1* | 10/2010 | Hayashi | ................. | B60R 21/36 180/274 |

(Continued)

FOREIGN PATENT DOCUMENTS

| | | | | |
|---|---|---|---|---|
| DE | 19745873 A1 * | 4/1999 | ............ | B60R 21/13 |
| DE | 19803165 A1 * | 7/1999 | ............ | B60R 21/36 |

(Continued)

*Primary Examiner* — Barry Gooden, Jr.
(74) *Attorney, Agent, or Firm* — DLA Piper LLP (US)

(57) ABSTRACT

An airbag apparatus for protecting a pedestrian. An unfolded airbag cushion includes a roof chamber part unfolded to cover a front part of a roof panel, left and right pillar chamber parts unfolded to cover front pillars, and a windshield chamber part unfolded to cover the entire surface of a windshield glass. The airbag apparatus is configured to protect the head and upper body of the pedestrian maximally and efficiently by using the roof chamber part, the pillar chamber parts, the windshield chamber part in a contact accident between a vehicle and a pedestrian and a cyclist.

12 Claims, 9 Drawing Sheets

(56) References Cited

U.S. PATENT DOCUMENTS

| | | | | |
|---|---|---|---|---|
| 2013/0119644 | A1* | 5/2013 | Rick | B60R 21/36 |
| | | | | 280/728.2 |
| 2014/0332305 | A1* | 11/2014 | Thomas | B60K 28/10 |
| | | | | 180/274 |
| 2015/0107928 | A1* | 4/2015 | Mazanek | B60R 21/36 |
| | | | | 180/274 |
| 2016/0264093 | A1* | 9/2016 | Suemune | B60R 21/36 |
| 2016/0264094 | A1* | 9/2016 | Suemune | B60R 21/36 |
| 2018/0099639 | A1* | 4/2018 | Suemune | B60R 21/36 |
| 2019/0071050 | A1* | 3/2019 | Farooq | B60R 21/36 |
| 2019/0375368 | A1* | 12/2019 | Kanno | B60R 21/233 |
| 2020/0101918 | A1* | 4/2020 | Nagasawa | B60R 21/36 |
| 2020/0180550 | A1* | 6/2020 | Kwon | B60R 21/2338 |
| 2020/0269802 | A1* | 8/2020 | Clauss | B60R 21/36 |
| 2021/0229623 | A1* | 7/2021 | Kwon | B60R 21/2338 |
| 2022/0371541 | A1* | 11/2022 | Lee | B60R 21/36 |

FOREIGN PATENT DOCUMENTS

| | | | | | |
|---|---|---|---|---|---|
| DE | 102005048627 | A1 | * | 5/2007 | ............ B60R 21/36 |
| DE | 102006042375 | A1 | * | 3/2008 | ............ B60R 21/36 |
| EP | 2617608 | A1 | * | 7/2013 | ............ B60R 21/36 |
| JP | 07156749 | A | * | 6/1995 | ............ B60R 21/36 |
| JP | 2004330825 | A | * | 11/2004 | ........... B60R 19/483 |
| JP | 2006044569 | A | * | 2/2006 | |
| JP | 2008285109 | A | * | 11/2008 | ............ B60R 21/36 |
| JP | 2008285110 | A | * | 11/2008 | ............ B60R 21/36 |
| JP | 2009143359 | A | * | 7/2009 | ............ B60R 21/36 |
| JP | 2009143552 | A | * | 7/2009 | ............ B60R 21/36 |
| JP | 2009184490 | A | * | 8/2009 | ............ B60R 21/36 |
| JP | 2009208761 | A | * | 9/2009 | ............ B60R 21/36 |
| KR | 10-2016-0061191 | | | 5/2016 | |

* cited by examiner

AIRBAG APPARATUS FOR PROTECTING PEDESTRIAN

CROSS REFERENCE TO RELATED APPLICATION

The present application claims priority to Korean Patent Application No. 10-2021-0038101, filed Mar. 24, 2021, the entire contents of which is incorporated herein for all purposes by this reference.

BACKGROUND OF THE INVENTION

Field of the Invention

The present invention relates generally to an airbag apparatus for protecting a pedestrian and, more particularly, to an airbag apparatus for protecting a pedestrian, the apparatus being configured to be improved in protection performance for a pedestrian and a cyclist.

Description of the Related Art

In general, various airbag apparatuses are provided in vehicles to protect occupants when a vehicle accident occurs. Among these airbag apparatuses, an airbag apparatus for protecting a pedestrian is configured to protect the head and the upper body of the pedestrian with the airbag cushion unfolded toward a windshield glass of the vehicle when a vehicle accident occurs.

Recently, the development and dissemination of future smart vehicles such as electric vehicles and autonomous vehicles are gradually increasing. The smart vehicles as described above have hoods with a short longitudinal length, so that when a contact accident with a pedestrian or a cyclist occurs in driving, the probability of a pedestrian's head brought into contact with a vehicle roof is increasing, and the probability of injury to the pedestrian's head is increasing.

Therefore, in order to prepare for future smart vehicles with short hoods, it is necessary to develop an airbag apparatus with improved protection performance for a pedestrian and a cyclist.

The foregoing described as the controller and the controlling method of operating a fuel cell is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problem occurring in the related art, and the present invention is intended to provide an airbag apparatus for protecting a pedestrian, wherein the airbag apparatus is configured to maximally efficiently protect a pedestrian and a cyclist by using an airbag cushion unfolded to cover a windshield glass, front pillars, and a front part of a roof panel.

In order to achieve the above objective, according to one aspect of the present invention, there is provided an airbag apparatus for protecting a pedestrian, the airbag apparatus including: an airbag housing inserted into and fixed in a space in a front panel connecting a windshield glass to a roof panel; an airbag cushion stored in the airbag housing while being folded, the airbag cushion being configured to be unfolded to simultaneously cover the windshield glass, a front pillar, and a front part of the roof panel when being supplied with airbag gas and unfolded; an inflator securely provided in the airbag housing and configured to generate the airbag gas in operation thereof; and a housing cover coupled to the airbag housing to cover the airbag housing, and having a tear line to allow the airbag cushion to be unfolded.

The airbag cushion may be configured to be folded such that the folded state thereof in the airbag housing may be divided into a zigzag folded part and a roll folded part.

The zigzag folded part may be a section folded at a portion of the airbag cushion connected to the inflator to induce rapid unfolding of the airbag cushion at an initial stage of operation of the inflator; and the roll folded part may be a section folded continuously from the zigzag folded part.

The roll folded part may be configured to be folded in a rolled shape in a direction of the windshield glass, and in unfolding of the airbag cushion, the roll folded part may be unfolded while being in contact with the windshield glass.

The airbag cushion may include a roof chamber part configured to be unfolded to cover the front part of the roof panel on the basis of an unfolded state thereof; left and right pillar chamber parts respectively connected to left and right portions of the roof chamber part and configured to be unfolded to cover front pillars; and a windshield chamber part located between the pillar chamber parts and connected to both the pillar chamber parts and configured to be unfolded to cover an entire front surface of the windshield glass.

The airbag gas generated in the inflator may be configured to be supplied in an order of the roof chamber part, the pillar chamber parts, and the windshield chamber part.

The roof chamber part may be configured to be unfolded in left and right directions by receiving the airbag gas; and the pillar chamber parts and the windshield chamber part may be configured to be unfolded forward before the unfolding of the roof chamber part is completed.

Based on a state in which the airbag cushion is unfolded, a vertical thickness of the windshield chamber part may be relatively thinner than vertical thicknesses of the pillar chamber parts, and the roof chamber part and the pillar chamber parts may have vertical thicknesses equal to each other.

In order to make the vertical thickness of the windshield chamber part relatively thinner than the vertical thicknesses of the roof chamber part and the pillar chamber parts, the windshield chamber part may have at least one seam portion formed in a linear shape.

The vertical thicknesses of the roof chamber part and the pillar chamber parts may be relatively thicker than the vertical thickness of the windshield chamber part as the roof chamber part and the pillar chamber parts are provided no seam portion.

The roof chamber part may be connected to the inflator; a diffuser may be coupled to a portion of the roof chamber part where the roof chamber part may be connected to the inflator; and the airbag gas generated from the inflator may be configured to be distributed into the left and right two pillar chamber parts through the diffuser.

The airbag gas generated from the inflator may be configured to be first brought into contact with the diffuser to prevent the airbag cushion from being damaged by the airbag gas.

The diffuser may have two outlets provided facing opposite directions to each other to supply the airbag gas into the two pillar chamber parts; and in order to supply same volume of the airbag gas into the two pillar chamber parts, the two outlets of the diffuser may be formed in same outlet diameters.

In order to distribute and supply the same volume of the airbag gas into the two pillar chamber parts, a distance between the two outlets may be formed in a greater size than the outlet diameters.

According to the airbag apparatus for protecting a pedestrian of the present invention, the unfolded airbag cushion includes the roof chamber part unfolded to cover the front part of the roof panel, the pillar chamber parts at the left and right portion thereof, the pillar chamber parts being unfolded to cover the front pillars, and the windshield chamber part unfolded to cover the entire front surface of the windshield glass. When a contact accident of a vehicle occurs with a pedestrian and a cyclist, the airbag apparatus can maximally efficiently protect the head and the upper body of the pedestrian by using the roof chamber part, the pillar chamber parts, and the windshield chamber part. Specifically, the apparatus of the present disclosure can be efficiently applied to future smart vehicles with short hoods, such as electric vehicles and autonomous vehicles.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

A controller according to an exemplary embodiment of the present invention may be implemented by a nonvolatile memory (not shown), which consists of an algorithm configured to control operations of various components of a vehicle or data regarding software instructions to play the algorithm, and a processor (not shown), which is configured to perform operations described below using the data stored in the memory. The memory and processor may be implemented as separate chips. Alternatively, the memory and processor may be implemented as single chips integrated with each other. The processor may take the form of one or more processors.

Hereinbelow, an airbag apparatus for protecting a pedestrian according to an exemplary embodiment of the present invention will be described with reference to accompanying drawings.

According to the present invention, as shown in FIGS. 1 to 9, the airbag apparatus for protecting a pedestrian includes: an airbag housing 100 inserted into and fixed in a space of the front panel 30 connecting a windshield glass 10 to a roof panel 20; an airbag cushion 200 stored in the airbag housing 100 while being folded, and when being supplied with airbag gas and unfolded, the airbag cushion 200 being unfolded to simultaneously cover the windshield glass 10, front pillars 40, and a front part 51 of a roof panel 50; an inflator 300 securely provided in the airbag housing 100 and generating the airbag gas in operation thereof; and a housing cover 400 coupled to the airbag housing 100 to cover the airbag housing 100 and having a tear line 410 to allow unfolding of the airbag cushion 200.

The front panel 30 supports the roof panel 20 to prevent breaking of a vehicle body. The front panel 30 has an empty space therein so that the airbag apparatus for protecting a pedestrian according to the present invention that is modularized is provided in the empty space in the front panel 30.

The front pillars 40 refer to as A pillars, and supports the roof panel 20 together with a center pillar (B pillar) and a rear pillar (C pillar) and supports the windshield glass 10 and a window of the vehicle.

The airbag housing 100 is inserted into the inside space of the front panel 30 and is securely provided in the front panel 30 by using a stud or a structure corresponding to a stud.

The airbag cushion 200 in the folded state is stored in the inside space of the airbag housing 100, and the inflator 300 is located in the airbag cushion 200, and the inflator is securely provided in the airbag housing 100 by using a hardware passing through the airbag cushion 200 and the airbag housing 100.

The inflator 300 is operated when being transmitted with an electric signal from an airbag controller to generate airbag gas required for unfolding of the airbag cushion 200. The airbag gas generated from the inflator 300 is supplied to the airbag cushion 200 folded in the airbag housing 100, and the airbag cushion 200 is unfolded by being supplied with the airbag gas, and the airbag cushion 200 is unfolded to simultaneously cover the windshield glass 10, the front pillars 40, and the front part 51 of the roof panel 50 through the tear line 410 of the airbag housing 100.

Therefore, in the event of a contact accident between the vehicle and a cyclist or pedestrian, the upper body including the head of the pedestrian may be protected by the airbag cushion 200 unfolded to cover the windshield glass 10, the front pillars 40, and the front part 51 of the roof panel 50 simultaneously. According to the embodiment of the present invention, the pedestrian can be protected as effectively as possible.

Reference numeral 60 is a head lining and reference numeral 70 is a sun visor.

Figure 7:
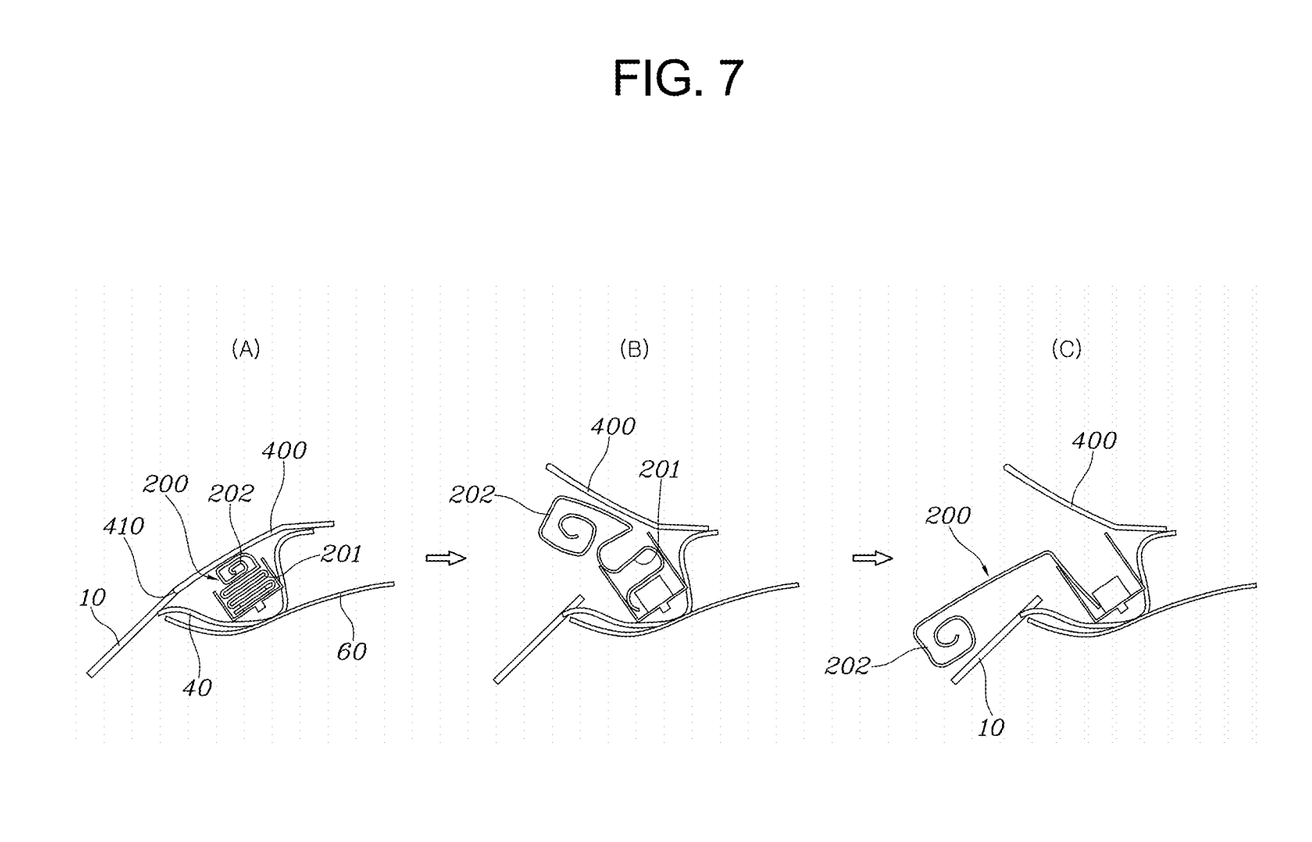
FIG. 7 is a view showing an unfolding process of the airbag cushion in a folded state according to the present invention.

As shown in FIG. 7, the airbag cushion 200 is folded in the airbag housing 100 such that a folded state thereof is divided into a zigzag folded part 201 and a roll folded part 202.

The zigzag folded part 201 is a section folded at a portion of the airbag cushion 200 connected to the inflator 300 in order to induce rapid unfolding of the airbag cushion 200 at an initial stage of operation of the inflator 300. The roll folded part 202 is a section folded continuously from the zigzag folded part 201.

Therefore, when the inflator 300 is operated to generate the airbag gas and the airbag gas is supplied to the airbag cushion 200 in the folded state to allow the airbag cushion 200 to start an unfolding operation, the tear line 410 of the airbag housing 100 is torn by an unfolding pressure of the airbag cushion 200 to open the housing cover 400, and the zigzag folded part 201 begins to be first unfolded rapidly in an unfolding direction through an open path of the housing cover 400 and then the roll folded part 202 begins to be unfolded, and finally, unfolding of the airbag cushion 200 is completed.

Meanwhile, in folding, the roll folded part 202 is folded in a rolled direction toward the windshield glass 10, and thus in unfolding, the roll folded part 202 is unfolded while being in contact with the windshield glass 10. Therefore, in unfolding, the roll folded part 202 may be prevented from being folded while protruding upward and more precise and rapid unfolding operation of the airbag cushion 200 may be induced.

Figure 8:
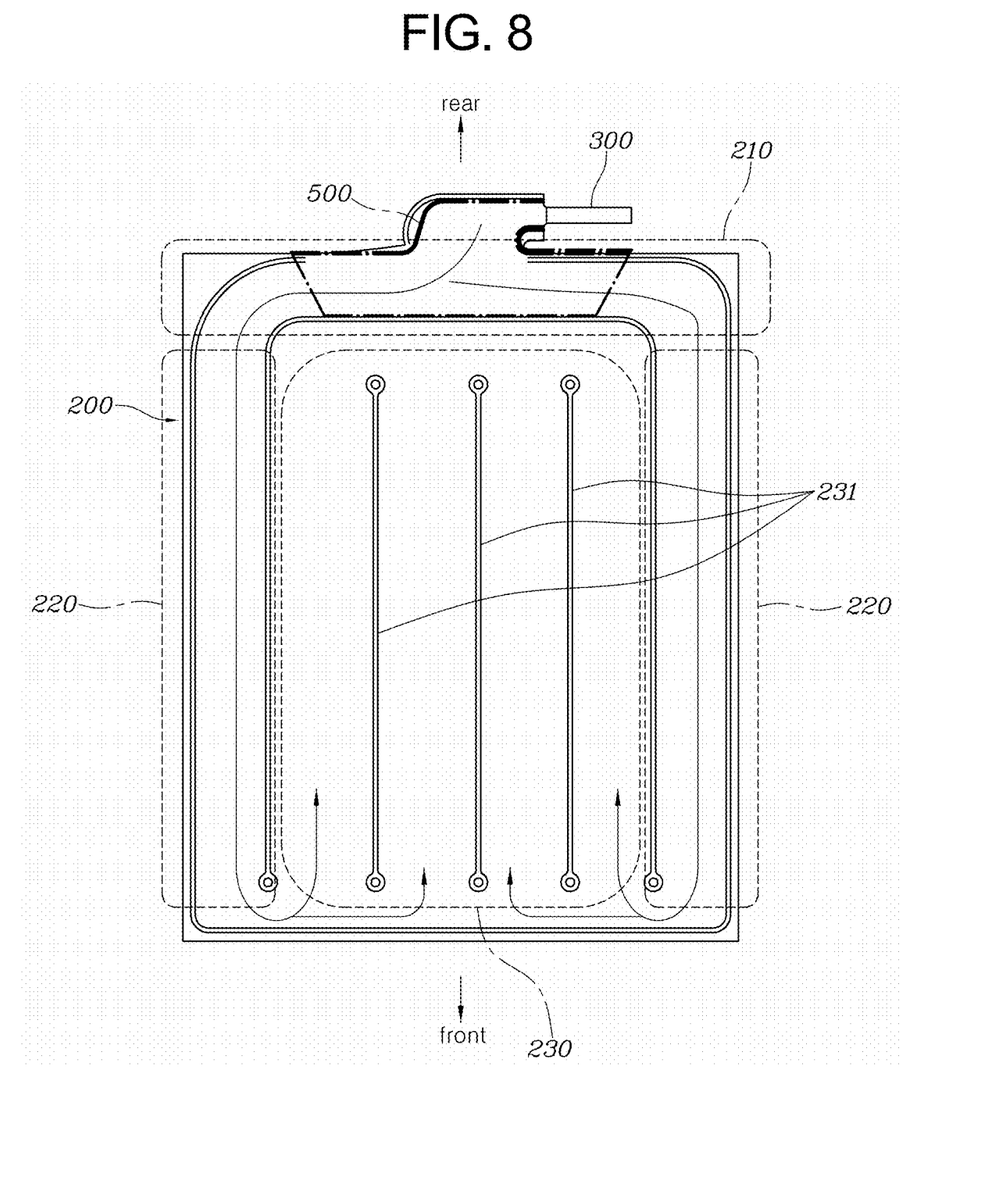
FIG. 8 is a view showing the airbag cushion in an unfolded state according to the present invention.

As shown in FIG. 8, the airbag cushion 200 includes a roof chamber part 210 unfolded to cover the front part 51 of the roof panel 50 on the basis of the unfolded state thereof, left and right pillar chamber parts 220 respectively connected to left and right portions of the roof chamber part 210 and unfolded to cover the front pillars 40, and a windshield chamber part 230 located between the pillar chamber parts 220 and connected to the pillar chamber parts 220 to cover an entire front surface of the windshield glass 10.

When the inflator 300 is operated to generate airbag gas, the airbag gas is supplied into the roof chamber part 210 first, and the airbag gas that has passed through the roof chamber part 210 is supplied into the left and right two pillar chamber parts 220 simultaneously, and the airbag gas is finally supplied into the windshield chamber part 230 through the pillar chamber parts 220.

Therefore, when the inflator 300 is operated and the airbag gas is generated, the roof chamber part 210 is unfolded leftward and rightward by receiving the airbag gas first, and the pillar chamber parts 220 and the windshield chamber part 230 are unfolded forward before unfolding of the roof chamber part 210 is completed. However, the airbag gas is supplied into the windshield chamber part 230 through the pillar chamber parts 220, so that the windshield chamber part 230 expands last.

Figure 1:
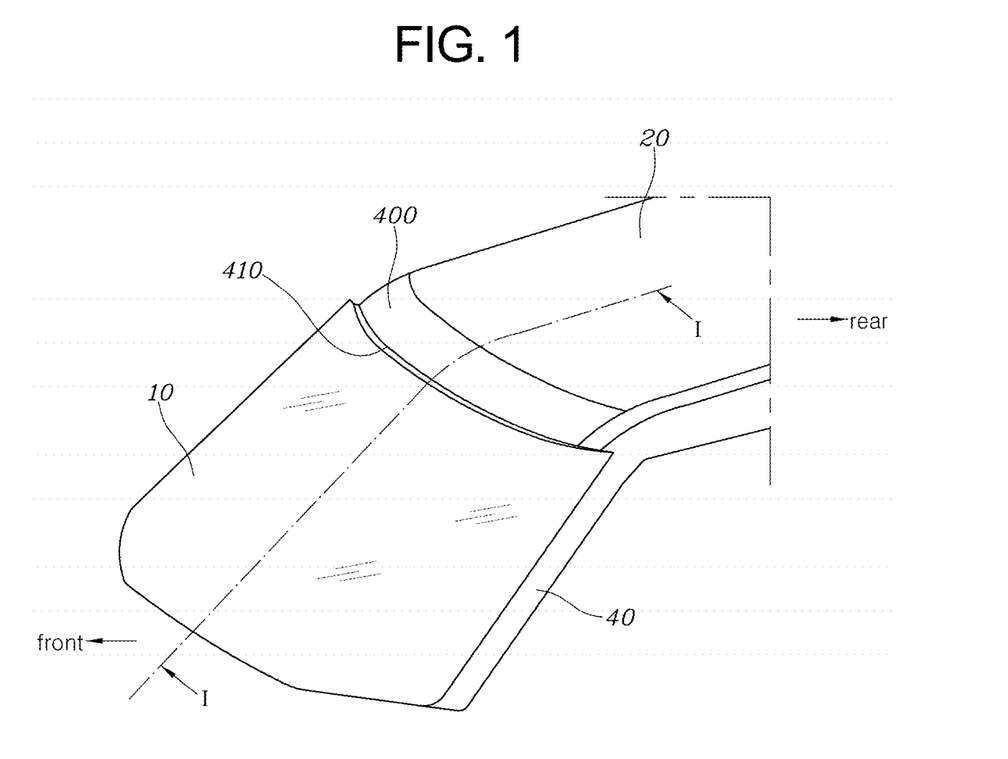
FIG. 1 is a view showing a vehicle with an airbag apparatus for protecting a pedestrian according to the present invention.
Figure 2:
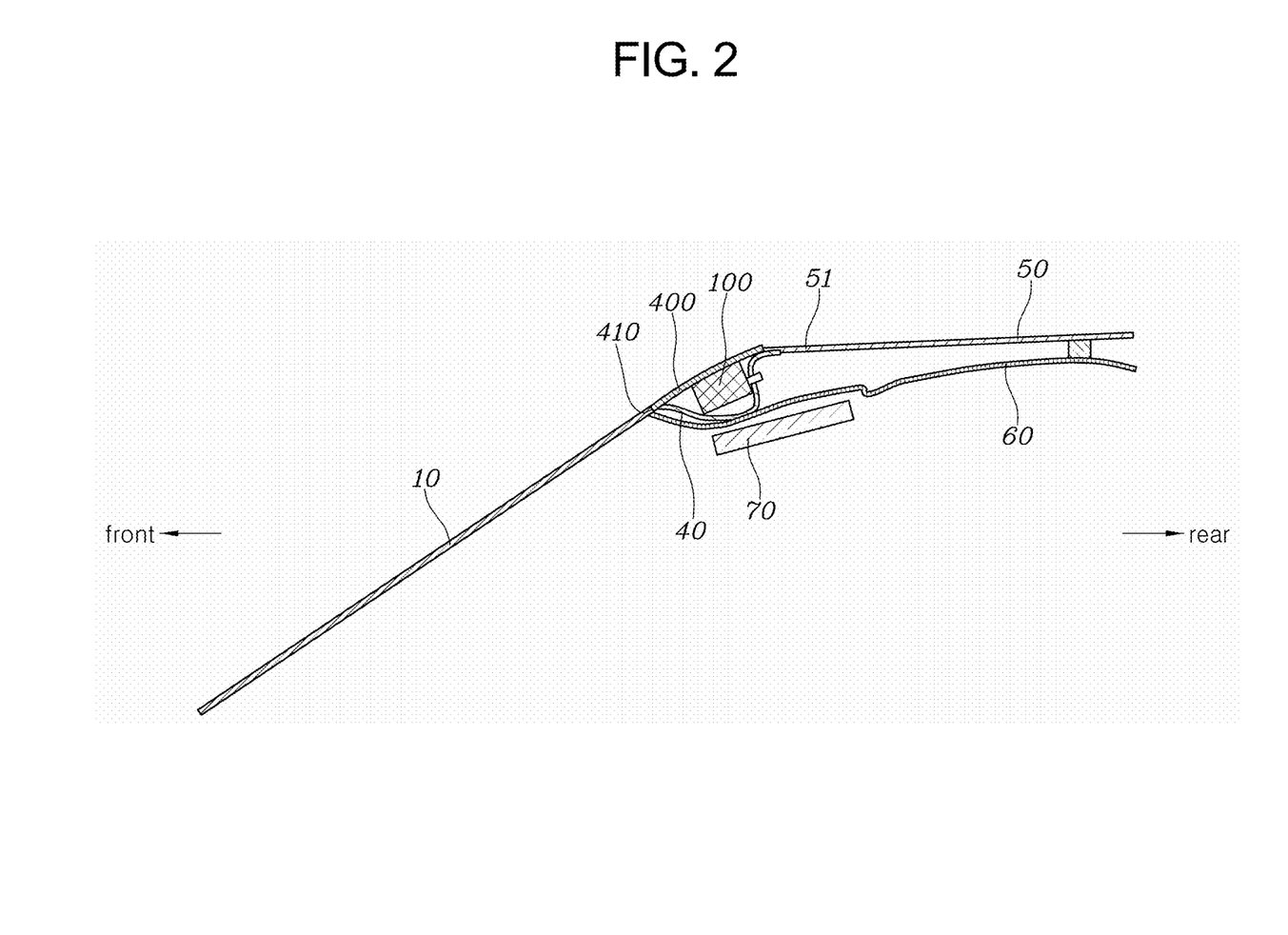
FIG. 2 is a sectional view taken along line I-I of FIG. 1.
Figure 3:
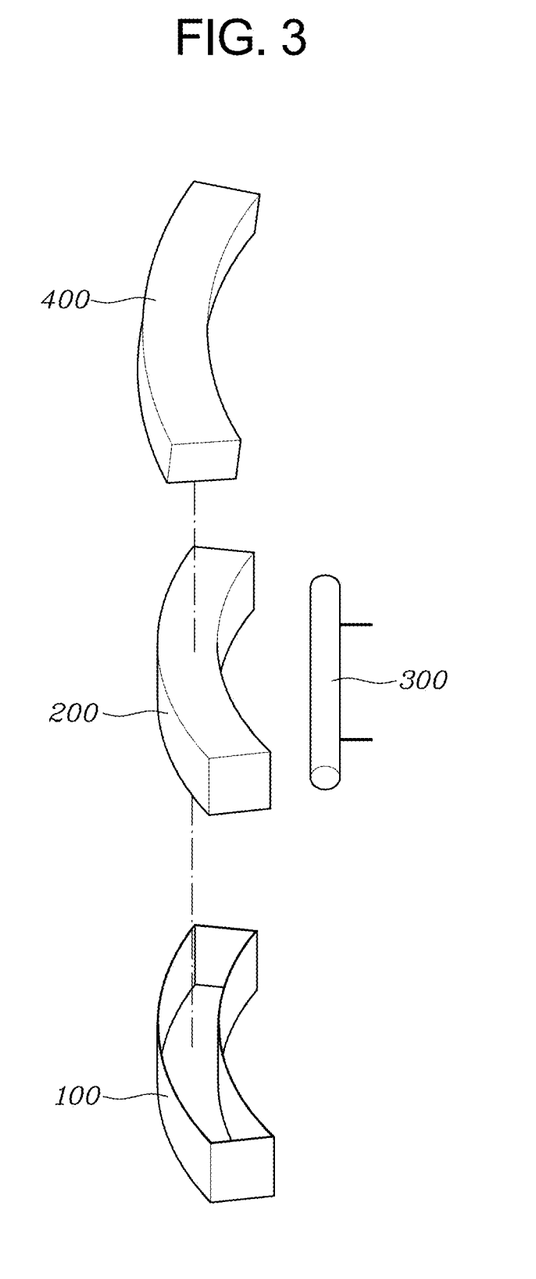
FIG. 3 is an exploded view showing the airbag apparatus for protecting a pedestrian according to the present invention.
Figure 4:
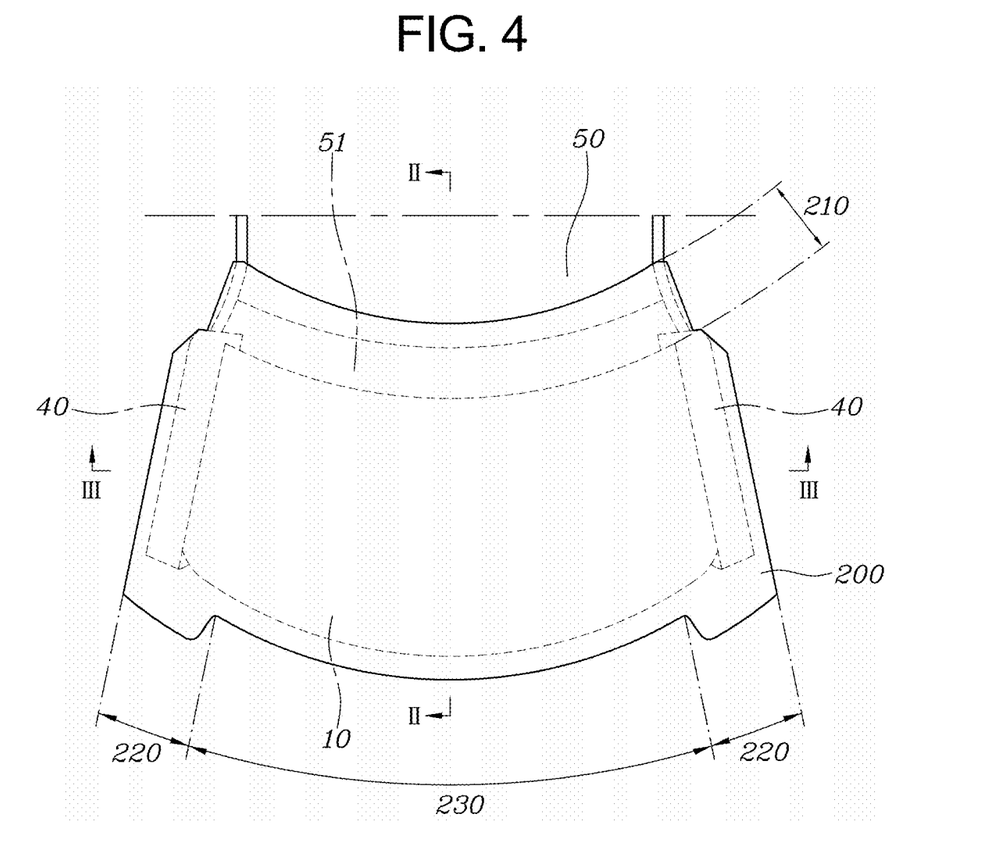
FIG. 4 is a view showing the airbag apparatus for protecting a pedestrian operated to unfold an airbag cushion according to the present invention.
Figure 5:
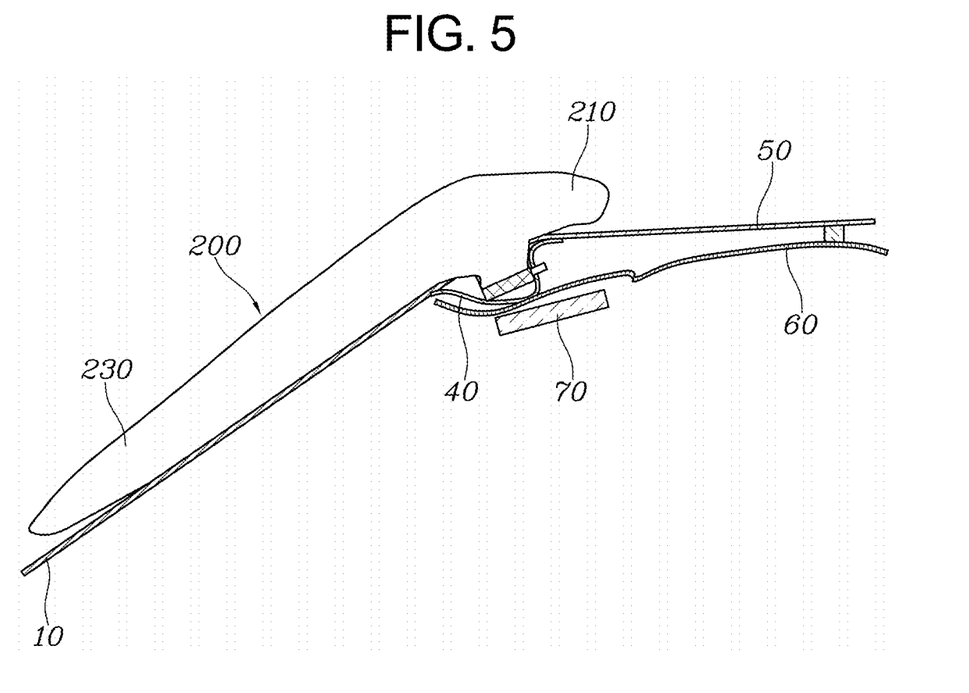
FIGS. 5 and 6 are sectional views taken along line II-II and line III-III of FIG. 4.
Figure 6:
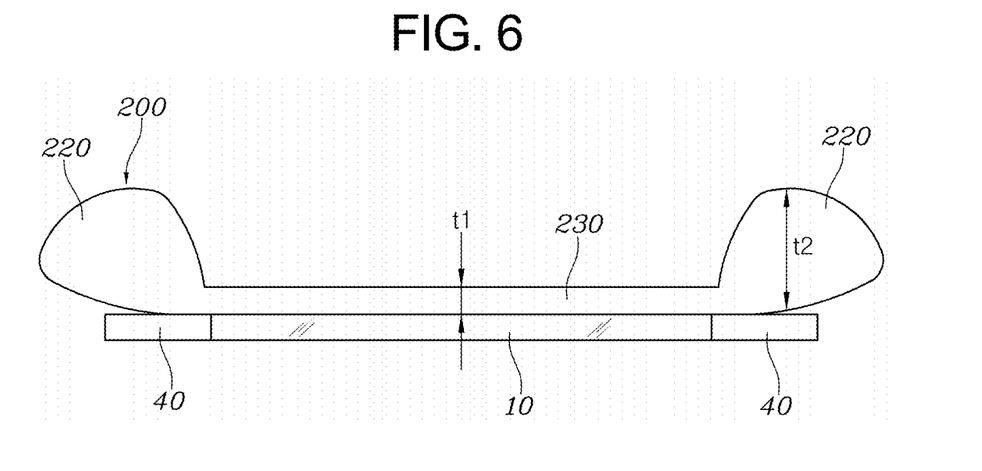

Based on a state in which the airbag gas is sufficiently supplied into the airbag cushion 200 and the airbag cushion 200 is fully unfolded, a vertical thickness t1 of the windshield chamber part 230 is relatively thinner than a vertically thickness of the pillar chamber parts 220, and vertical thicknesses t2 of the roof chamber part 210 and the pillar chamber parts 220 are equal to each other.

In other words, the windshield chamber part 230 is a portion covering the windshield glass 10, and the windshield glass 10 is a portion easily broken by an impact and absorbing the impact. Therefore, even when a thickness of the windshield chamber part 230 is not maintained in a thicker thickness, an impact is absorbed when the windshield glass 10 is broken, and the pedestrian can be sufficiently protected.

In the other hand, the roof chamber part 210 and the pillar chamber parts 220 are portions covering the roof panel 50 and the front pillars 40 made of steel. In order to minimize an impact applied to the pedestrian, it is preferable that the vertical thickness of the roof chamber part 210 and the vertical thickness of the pillar chamber parts 220 may be maintained thicker so as to maintain a maximal cushion feeling.

In order to form the vertical thickness of the windshield chamber part 230 thinner than the vertical thicknesses of the roof chamber part 210 and the pillar chamber parts 220, the windshield chamber part 230 has at least one seam portion 231 in a linear shape and the roof chamber part 210 and the pillar chamber parts 220 is provided with no seam portion.

The seam portion 231 is a portion where upper and lower surfaces of the windshield chamber part 230 are brought into contact with each other by sewing, and the seam portion 231 is a dead zone with zero cushion feeling as the airbag gas does not exist in the seam portion 231.

Therefore, as the seam portion 231 with zero cushion feeling is formed in the windshield chamber part 230, thickness of periphery of the seam portion 231 is reduced, so the thickness of the periphery of the seam portion 231 is inevitable to become thinner. Accordingly, even when the equal volume of airbag gas is supplied into the windshield chamber part 230, the windshield chamber part 230 maintains a thickness relatively thinner than the thicknesses of the roof chamber part 210 and the pillar chamber parts 220.

On the other hand, the seam portion described above is not formed in both the roof chamber part 210 and the pillar chamber parts 220, so the roof chamber part 210 and the pillar chamber parts 220 maintains the vertical thicknesses relatively thicker than the vertical thickness of the windshield chamber part 230.

Figure 9:
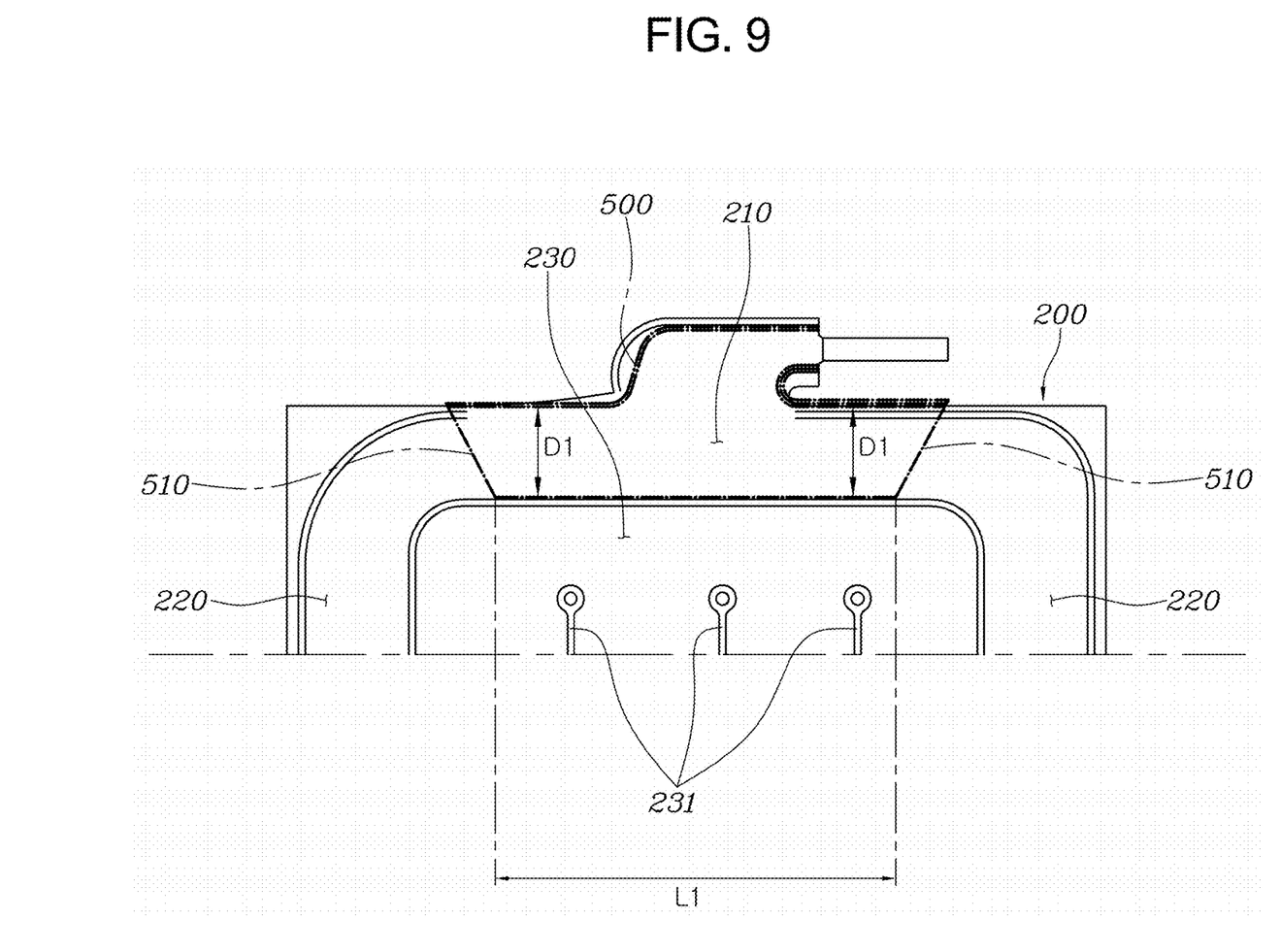
FIG. 9 is a view showing a diffuser coupled to a roof chamber part according to the present invention.

The roof chamber part 210 is connected to the inflator 300, and a portion of the roof chamber part 210 connected to the inflator 300 is coupled to a diffuser 500. The airbag gas generated from the inflator 300 is distributed into the two pillar chamber parts 220 at the left and the right through the diffuser 500.

When the airbag gas generated from the inflator 300 is introduced into the diffuser 500, the roof chamber part 210 is unfolded first, the airbag gas is distributed into the two pillar chamber parts 220 at the left and the right through the diffuser 500, and the two pillar chamber parts 220 are unfolded in following order.

The airbag gas generated from the inflator 300 is brought into contact with the diffuser 500 first and a damage to the airbag cushion 200 by the airbag gas can be prevented, and thus durability of the airbag cushion 200 can be achieved.

The diffuser 500 has two outlets 510 to supply airbag gas into the two pillar chamber parts 220, the outlets 510 being directed in opposite directions, and in order to supply the same volume of airbag gas into the two pillar chamber parts 220, it is preferable that diameters D1 of the two outlets 510 are formed in the same size.

Furthermore, in order to distribute and supply the same volume of airbag gas into the two pillar chamber parts 220, it is preferable that a distance L1 between the two outlets 510 is formed in greater size than each of the diameters D1 of the outlets 510.

However, when the distance L1 between the outlets 510 is less than or equal to the diameters D1 of the outlets 510, there is a high possibility that the same amount of airbag gas may not be supplied into the two pillar chamber parts 220 through the diffuser 500. In the above case, among the two pillar chamber parts 220, one pillar chamber part 220 into which the airbag gas is relatively supplied is first unfolded, so the entire airbag cushion 200 may not be stably unfolded. In order to solve the above problem, it is preferable that the distance L1 between the two outlets 510 is formed in a greater size than the diameters D1 of the outlets 510.

As described above, in the airbag apparatus for protecting a pedestrian according to the present invention, the airbag cushion 200 in the unfolded state includes the roof chamber part 210 unfolded to cover the front part 51 of the roof panel 50, the left and right pillar chamber parts 220 unfolded to cover the front pillars 40, and the windshield chamber part 230 unfolded to cover the entire front surface of the windshield glass 10. When a contact accident of a vehicle occurs with a pedestrian and a cyclist, the airbag apparatus can maximally efficiently protect the head and the upper body of the pedestrian by using the roof chamber part 210, the pillar chamber parts 220, and the windshield chamber part 230. Specifically, the apparatus of the present disclosure can be efficiently applied to future smart vehicles with short hoods, such as electric vehicles and autonomous vehicles.

Although the preferred embodiment of the present invention has been disclosed for illustrative purposes, those skilled in the art will appreciate that various modifications, additions, and substitutions are possible, without departing from the spirit and scope of the present invention.

What is claimed is:

1. An airbag apparatus for protecting a pedestrian, the airbag apparatus comprising:
   an airbag housing inserted into and fixed in a space in a front panel connecting a windshield glass to a roof panel;
   an airbag cushion stored in the airbag housing while being folded, the airbag cushion being configured to be unfolded to simultaneously cover the windshield glass, a front pillar, and a front part of the roof panel when being supplied with an airbag gas, wherein the airbag cushion comprises:
      a roof chamber part configured to be unfolded to cover the front part of the roof panel based on an unfolded state thereof,
      left and right pillar chamber parts respectively connected to left and right portions of the roof chamber part and being configured to be unfolded to cover front pillars, and
      a windshield chamber part located between the pillar chamber parts and connected to both the pillar chamber parts and being configured to be unfolded to cover an entire front surface of the windshield glass,
      wherein based on a state in which the airbag cushion is unfolded, a vertical thickness of the windshield chamber part is relatively thinner than a vertical thicknesses of the pillar chamber parts, and the roof chamber part and the pillar chamber parts have vertical thicknesses equal to each other;
   an inflator securely provided in the airbag housing and being configured to generate the airbag gas during operation thereof; and
   a housing cover coupled to the airbag housing to cover the airbag housing and having a tear line to allow the airbag cushion to be unfolded.

2. The airbag apparatus of claim 1, wherein the airbag gas generated in the inflator is configured to be supplied in an order of the roof chamber part, the pillar chamber parts, and the windshield chamber part.

3. The airbag apparatus of claim 1, wherein the roof chamber part is configured to be unfolded in left and right directions by receiving the airbag gas; and
   the pillar chamber parts and the windshield chamber part are configured to be unfolded forward before the unfolding of the roof chamber part is completed.

4. The airbag apparatus of claim 1, wherein the windshield chamber part has at least one seam portion formed in a linear shape to make the vertical thickness of the windshield chamber part relatively thinner than the vertical thicknesses of the roof chamber part and the pillar chamber parts.

5. The airbag apparatus of claim 1, wherein the vertical thicknesses of the roof chamber part and the pillar chamber parts are relatively thicker than the vertical thickness of the windshield chamber part as the roof chamber part and the pillar chamber parts are provided without a seam portion.

6. The airbag apparatus of claim 1, wherein the airbag cushion is configured to be folded such that a folded state thereof in the airbag housing is divided into a zigzag folded part and a roll folded part.

7. The airbag apparatus of claim 6, wherein the zigzag folded part is a section folded at a portion of the airbag cushion connected to the inflator to induce rapid unfolding of the airbag cushion at an initial stage of operation of the inflator; and the roll folded part is a section continuously folded from the zigzag folded part.

8. The airbag apparatus of claim 6, wherein the roll folded part is configured to be folded in a rolled shape in a direction of the windshield glass, and configured to be unfolded while being in contact with the windshield glass during unfolding of the airbag cushion.

9. An airbag apparatus for protecting a pedestrian, the airbag apparatus comprising:

an airbag housing inserted into and fixed in a space in a front panel connecting a windshield glass to a roof panel;

an airbag cushion stored in the airbag housing while being folded, the airbag cushion being configured to be unfolded to simultaneously cover the windshield glass, a front pillar, and a front part of the roof panel when being supplied with an airbag gas, wherein the airbag cushion comprises:

a roof chamber part configured to be unfolded to cover the front part of the roof panel based on an unfolded state thereof, left and right pillar chamber parts respectively connected to left and right portions of the roof chamber part and being configured to be unfolded to cover front pillars, and a windshield chamber part located between the pillar chamber parts and connected to both the pillar chamber parts and being configured to be unfolded to cover an entire front surface of the windshield glass, an inflator securely provided in the airbag housing and being configured to generate the airbag gas during operation thereof; and a housing cover coupled to the airbag housing to cover the airbag housing and having a tear line to allow the airbag cushion to be unfolded;

wherein: the roof chamber part is connected to the inflator;

a diffuser is coupled to a portion of the roof chamber part where the roof chamber part is connected to the inflator; and the airbag gas generated from the inflator is configured to be distributed into the left and right pillar chamber parts through the diffuser.

10. The airbag apparatus of claim 9, the airbag gas generated from the inflator is configured to be first brought into contact with the diffuser to prevent the airbag cushion from being damaged by the airbag gas.

11. The airbag apparatus of claim 9, wherein the diffuser has two outlets facing opposite directions to each other to supply the airbag gas into the pillar chamber parts; and the two outlets of the diffuser are formed in same outlet diameters to supply same volume of the airbag gas into the two pillar chamber parts.

12. The airbag apparatus of claim 11, wherein a distance between the two outlets is formed in a greater size than the outlet diameters to distribute and supply the same volume of the airbag gas into the two pillar chamber parts.

* * * * *